United States Patent
Barrenscheen et al.

(10) Patent No.: US 6,292,862 B1
(45) Date of Patent: Sep. 18, 2001

(54) BRIDGE MODULE

(75) Inventors: Jens Barrenscheen, München; Gunther Fenzl, Höhenkirchen-Siegerstbrunn; Achim Vowe, München, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/123,825

(22) Filed: Jul. 28, 1998

(51) Int. Cl.$^7$ .............................. G06F 13/00; G06F 13/38
(52) U.S. Cl. .................... 710/129; 710/5; 710/20; 710/110; 710/126; 710/128; 710/266; 710/269; 709/213; 370/412; 375/347
(58) Field of Search .................... 710/129, 128, 710/126, 5, 266, 110, 20, 269; 375/347; 709/213; 370/412

(56) References Cited

U.S. PATENT DOCUMENTS

| | | | |
|---|---|---|---|
| 5,633,865 | * | 5/1997 | Short ........................ 370/412 |
| 5,842,038 | * | 11/1998 | Williams et al. ............ 710/5 |
| 6,024,035 | * | 2/2000 | Flamme ...................... 111/178 |

FOREIGN PATENT DOCUMENTS 35 06 118 C2    1/1991   (DE) .

OTHER PUBLICATIONS

Double–CAN Controller as Bridge for Different CAN Networks, (Jens Eltze), 4th Internaltional Conference, 1997, pp. 15–17 thur 15–19.*

"Double–CAN Controller as Bridge for Different CAN Networks" (Jens Eltze), 4$^{th}$ International Conference, 1997, pp. 15–17—15–19.

* cited by examiner

*Primary Examiner*—Rupal Dharia
(74) *Attorney, Agent, or Firm*—Herbert L. Lerner; Laurence A. Greenberg; Werner H. Stemer

(57) ABSTRACT

The bridge module is connected between at least two bus systems and is suitable for serial data transfer of binary data from one of the bus systems to the other one of the bus systems. A single memory device is provided for buffer storage of the data during a data transfer. The data transfer, which is controlled exclusively by the data to be transmitted, is thus carried out in a simple manner and completely automatically, without the interposition of a processor unit. It is thereby possible very easily and thus also at an attractive cost to specify a module which is suitable for the data transfer between different bus systems.

9 Claims, 2 Drawing Sheets

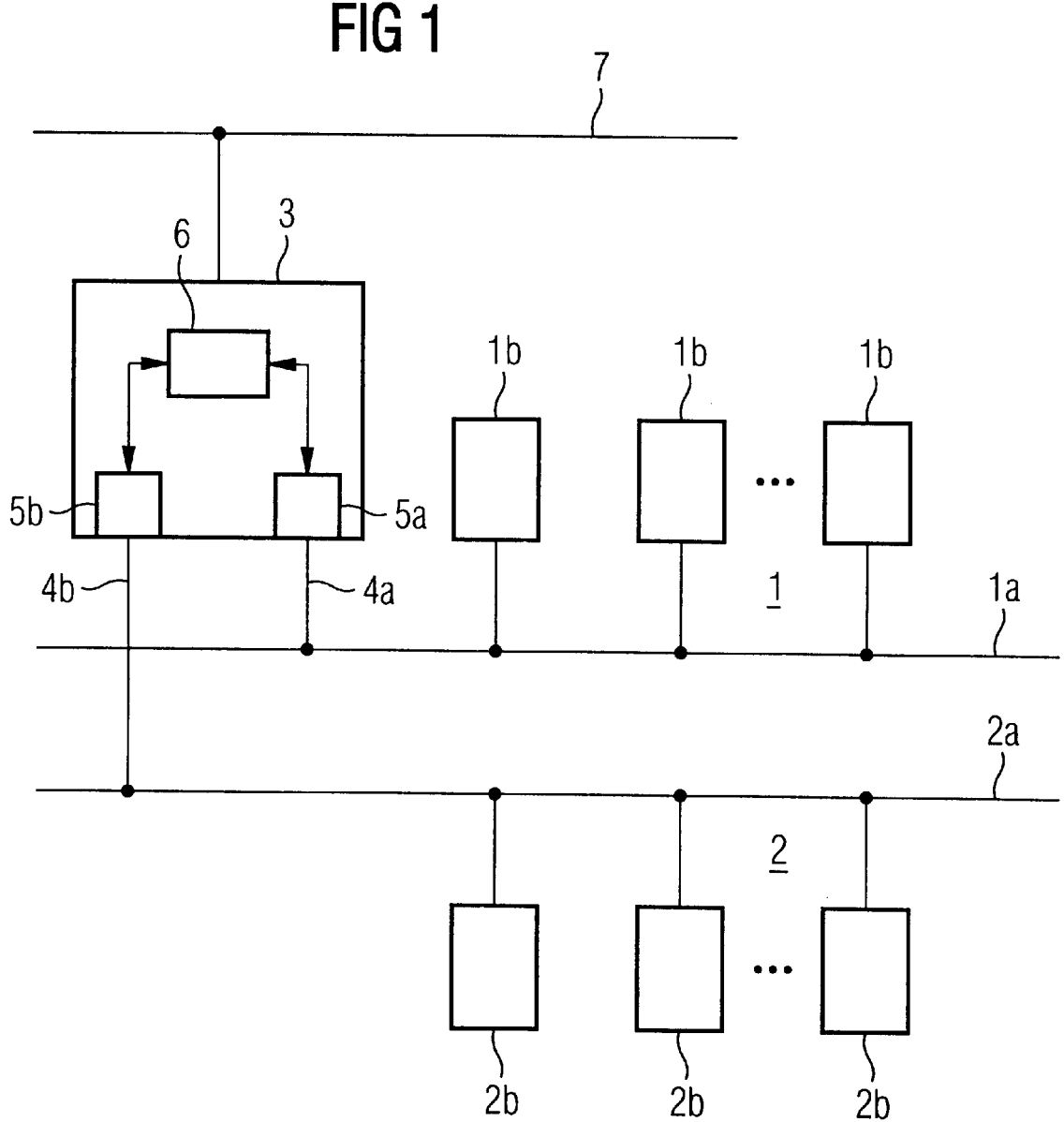

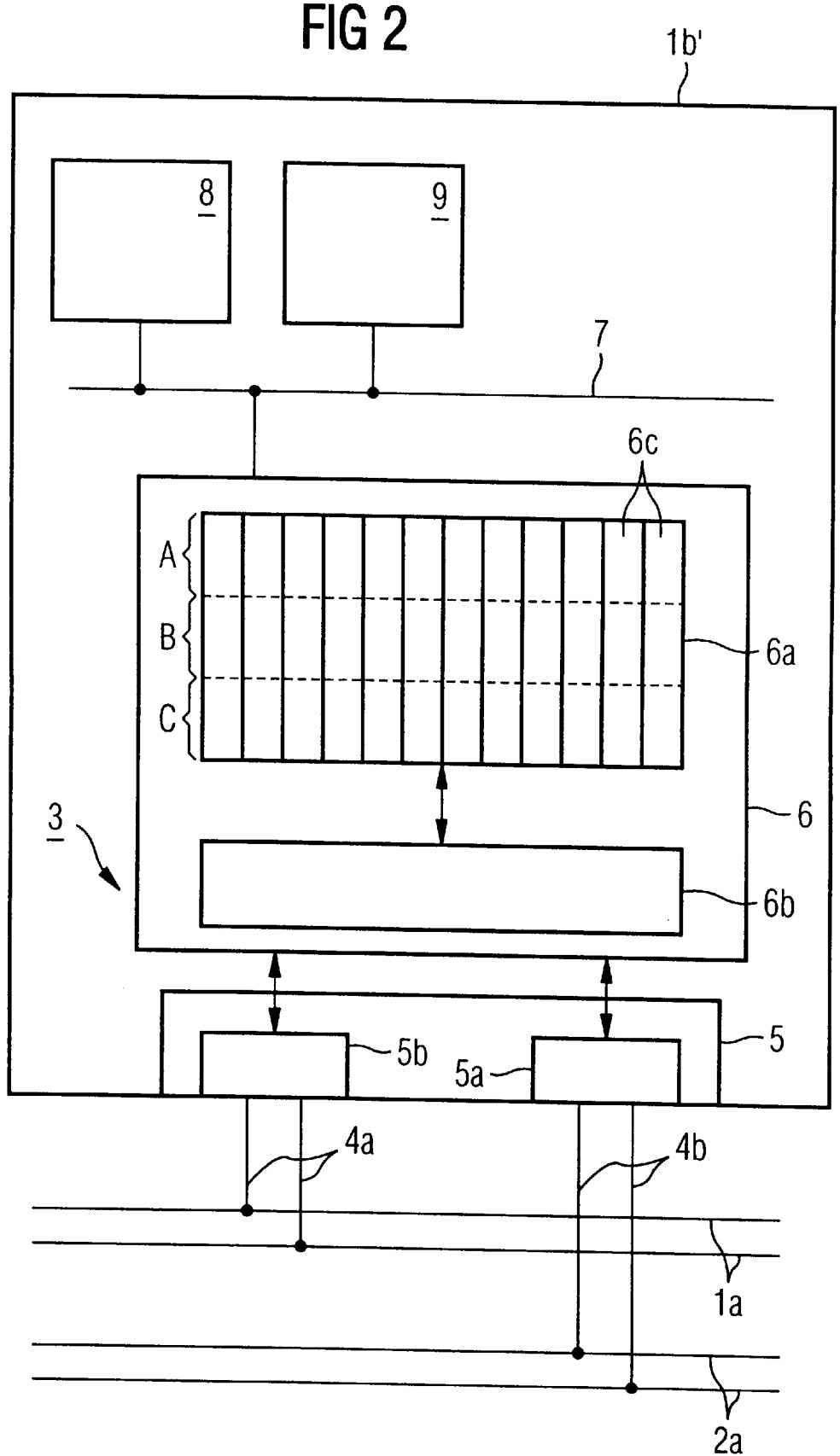

BRIDGE MODULE

BACKGROUND OF THE INVENTION

Field of the Invention

The invention relates to a bridge module which is connected between at least two bus systems and is suitable for serial data transfer of binary data from one of the bus systems to at least one other of the bus systems.

Such bus systems may be, for example, local computer networks. In such bus systems or local computer networks, which are increasingly used in motor vehicle electronics, a subscriber station communicates via a data bus with at least one other subscriber station which is connected to the same data bus. See, for instance, German publication DE 35 06 118, which discloses a so-called Controller Area Network (CAN network). The CAN network is an example of such a bus system.

With the increasing requirement for electronic components in motor vehicles, it is advantageous to use more than two local bus systems, for example at different data transmission rates. This also, of course, results in an increased requirement for subscriber stations of different bus systems to be able to communicate with one another. A so-called bridge module may be provided, for example, for the purpose of data transfer between different bus systems.

A bridge module of the above type and which is suitable for data transfer between different bus systems has been described in Jens Eltze, "Double CAN Controller as Bridge for Different CAN Networks," 4th Int'l Conference, Berlin, 10/1997, pages 15–17 to 15–19. There, particularly in FIG. 1, a technical implementation is presented of a programmable bridge module which, for the purpose of data transfer and for data filtering, is arranged between the subscriber stations of two CAN bus systems.

The programmable bridge module described there has a similar characteristic to a central processing unit (CPU) and thus allows data to be processed and handled. A separate micro-processor is required there, to provide an additional CPU for the data transfer and for data filtering. An additional microprocessor, which is used exclusively for the data transfer between different bus systems, is, however, extremely costly.

SUMMARY OF THE INVENTION

It is accordingly an object of the invention to provide a bridge module, which overcomes the above-mentioned disadvantages of the heretofore-known devices and methods of this general type and which allows data to be transferred in a simple manner between at least two bus systems.

With the foregoing and other objects in view there is provided, in accordance with the invention, a bridge module connected in a data transmission system between at least two bus systems for serial data transfer of binary data from one of the bus systems to the other one of the bus systems. The bridge module comprises:

a single memory device for buffer storage of data during a data transfer from one bus system to another bus system, the data transfer in the memory device being carried out under data control without a control device interposed.

In other words, the object of the invention is satisfied by a bridge module that has a single memory device for buffer storage of the data during a data transfer, whereby the data transfer in the memory device is carried out under data control without the interposition of a control device.

The particular advantage of the present invention is thus the provision of a bridge module which is arranged between at least two different bus systems. A single memory device is provided in this case for the data transfer, and is used for buffer storage of the data between the different bus systems. The data transfer, which is controlled by the data to be transmitted, thus takes place completely automatically, that is to say without the interposition of a central processing unit. In this way, it is possible very easily to specify a module which is suitable for data transfer between different bus systems.

In accordance with an added feature of the invention, each of the at least two bus systems has a data bus and a subscriber station connected to the data bus for the purpose of data communication with one another, and wherein the bridge module is integrated in one of the subscriber stations. The memory device which is integrated in the bridge module is specified to have a fixed memory size. It is thus particularly advantageous for the bridge module also to be integrated as part of a subscriber station which is connected to one of the bus systems. In this case, the internal memory of this subscriber station can advantageously also be used as a memory device of the bridge module. In a further advantageous refinement, the memory size of the memory device can be expanded or reduced as desired, depending on the application. In other words, the memory device has a freely configurable memory size.

In accordance with another feature of the invention, the bridge module is connected between no more than the two bus systems.

In accordance with again another feature of the invention, data on a first data bus of a first bus system are driven at a higher data transmission rate than on a second data bus of a second bus system and the bridge module is adapted to transmit the data between the first and second bus systems. In the so-called CAN bus systems with high data transmission rates of up to 1 Mbit/s, the line length of the bus system is limited to 40 m while in CAN bus systems with a relatively low data transmission rate, the line length may be increased up to 1000 m, although in this case a data transmission rate of only about 40 kbit/s is possible. The "fast" bus system and the "slow" bus system can then be coupled to one another using the bridge module.

In accordance with yet another feature of the invention, at least a part of the memory device is configurable as a FIFO buffer memory. Such first-in, first-out memories are suitable in particular for data buffering for a data transfer between the bus systems of different speed.

In accordance with a concomitant feature of the invention, the bridge module according to the invention is arranged between two CAN bus systems in a motor vehicle power supply system.

Other features which are considered as characteristic for the invention are set forth in the appended claims.

Although the invention is illustrated and described herein as embodied in a bridge module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram of a bridge module according to the invention for data transfer between two bus systems; and FIG. 2 is a detailed schematic view of an exemplary embodiment of the bridge module according to the invention, which is integrated in a subscriber station connected to one of the bus systems.

BRIEF DESCRIPTION OF THE DRAWINGS

Identical or functionally equivalent elements in the figures of the drawing are identified with identical reference symbols, unless stated to the contrary.

Referring now to the figures of the drawing in detail and first, particularly, to FIG. 1 thereof, there is seen a bridge module according to the invention for data transfer between two bus systems. A first bus system 1 in the present exemplary embodiment contains a data bus 1a and a number of subscriber stations 1b which are connected to the data bus 1a. Furthermore, a second bus system 2 is illustrated, comprising a number of subscriber stations 2b which are connected to a second data bus 2a. A bridge module 3 is arranged between the data buses 1a, 2a of the two bus systems 1, 2. The bridge module 3 furthermore has a first interface circuit 5a and a second interface circuit 5b. The bridge module 3 is connected via the interface circuits 5a, 5b and via connecting lines 4a, 4b to the corresponding data buses 1a, 2a of the bus systems 1, 2. Furthermore, the bridge module 3 has a single memory device 6, which is respectively connected to each of the interface circuits 5a, 5b and thus to each of the bus systems 1, 2.

However, the bridge module 3 is advantageously not necessarily also connected to another bus 7. The bridge module 3 can be connected to other modules via the further bus 7, which optionally contains a data bus, address bus and control bus. Typically, however, the bridge module 3 is connected via the further bus 7 to a processor device, for example to the central processing unit (CPU).

In the present exemplary embodiment, the bridge module is used for data transfer between two bus systems 1, 2. However, the present invention is not exclusively limited to a bridge module 3 which is connected between two bus systems 1, 2. Instead the invention also covers any required number of bridge modules 3 which are connected between any desired number of bus systems 1, 2 for the purpose of data transfer.

FIG. 2 shows an advantageous exemplary embodiment of the bridge module according to the invention. Similarly to FIG. 1, FIG. 2 also shows two bus systems 1, 2, for which only the data buses 1a, 2a are illustrated. A multiplicity of subscriber stations 1b, 2b are coupled to each of the data buses 1a, 2a, but are not illustrated here for reasons of clarity.

The bridge module 3 in FIG. 2 has an interface circuit 5 which is typically designed as a state machine. As is indicated in the present exemplary embodiment, the interface circuit 5 has a first interface circuit 5a and a second interface circuit 5b for each of the connected data buses 1a, 2a. The interface circuits in 5a, 5b contain the communications protocols for the two connected data buses 1a, 2a.

Furthermore, the memory device 6, according to the invention, of the bridge module 3 has a physical memory 6a as well as a memory control device 6b. The memory device 6 is connected via connecting lines to the interface circuit 5, and thus to the bus systems 1, 2 which are connected to the bridge module 3. The memory control device 6b may advantageously be a coprocessor. The configuration of the memory control device 6b as a coprocessor has the advantage over fixed wiring that the data transfer can take place extremely quickly and flexibly. However, such a coprocessor must first be programmed in advance and, furthermore, it is considerably more complex and thus more costly to implement than fixed wiring.

FIG. 2 shows a preferred embodiment, in which the bridge module 3 is integrated in one of the subscriber stations 1b' which is connected to one of the data buses 1a, 2a. The subscriber station 1b' which contains the bridge module 3 has a central processing unit 8 as well as an internal memory 9, which is typically configured as RAM. Furthermore, a subscriber station 1b' may have further peripheral modules such as an analogue/digital converter, timer modules and, an interrupt device, etc. For reasons of clarity, the last-mentioned modules have not been illustrated in the subscriber station 1b' in FIG. 2. The individual modules are in each case connected via the internal bus 7 to one another, and thus to the memory device 6 of the bridge module 3.

The memory 6a of the bridge module 3 is typically organized on an object basis, that is to say the memory 6a comprises a multiplicity of memory objects 6c. Typically, but not necessarily, the various memory objects 6c in the memory 6a are of the same size. The individual memory objects 6c in the memory 6a are divided into the following memory object regions (A)–(C):

1. The identification region (A) essentially contains the identifier and control information, by means of which the respective memory object 6c accesses the data bus 1a, 2a assigned to it. For CAN applications, the identification region (A) has a length of 11 bits or 29 bits, depending on the operating mode.

2. The data to be transferred are buffer stored in the data region (B). In this case, the data region (B) must be made at least as long as the maximum amount of data which it is possible to choose for transmission in one data transfer per data packet. In the case of CAN applications, the length of the data region (B) is firmly specified by the data transmission protocol and it is a maximum of 8 bytes.

3. The control region (C) contains the monitoring and control functions for the data transfer. This essentially includes information relating to bus arbitration for a memory object 6c for the connected bus systems 1, 2, and relating to the nature and the bus operating mode of the data transfer. Furthermore, the control region (6c) contains data for general control of the data transfer. In the case of CAN applications, the size of the control region is variable, depending on the application.

The memory objects 6c in the memory 6a can be assigned flexibly and individually to each of the (two) connected bus systems 1, 2. If, for example, the memory device 6 has 32 memory objects 6c, then, for example, 20 memory objects 6c can be assigned to the first bus system 1 and the other 12 memory objects can be assigned to the second bus system 2. In this case, any other assignment of the memory objects 6c in the memory 6a is, of course, conceivable. The assignment can be redefined in a flexible manner once again by a user, via the central processing unit 8, depending on the respective requirements. In this way, it is possible to implement flexible functionality for the data transfer between the bus systems 1, 2 that are coupled to the bridge module 3.

The central processing unit 8 is used only for the configuration of the individual memory objects 6c in the memory 6a. However, furthermore, the data transfer described above takes place from one bus system 1, 2 to a second via the bridge module 3 without any assistance whatsoever from the computation power of the central processing unit 8. The data transfer thus takes place exclusively under data control. In this way, the computation power of the central processing unit is not adversely affected, thus not leading to any reduction in the performance capability of the corresponding subscriber station 1b' which contains the bridge module 3.

For CAN applications, the size of such a memory object 6c is dependent on the implementation. However, in the following text, it is assumed that the memory size of a memory object 6c is 32 bytes. A memory 6a having 1 kByte of RAM thus typically has 32 memory objects 6c. The memory size is in this case designed on the basis of the data transfer to be expected, such that it is completely sufficient for normal operation. Owing to additional requirements between the various bus systems 1, 2, more data may possibly be transferred between the various bus systems 1, 2 than envisaged. In this case, the size of the memory 6a in the bridge module 3 may be too small. There is then a requirement here for additional memory space resources or for memory expansion. Equally well, under some circumstances, there may also be a requirement on the part of the central processing unit 8 for a memory expansion, owing to increased processor activities.

For the situation in which the bridge module 3 is integrated as shown in FIG. 2 in one of the subscriber stations 1b', a single memory may advantageously be provided, which is used both as an internal memory 9 for the central processing unit 8 of the subscriber station 1b' and as the memory 6a of the bridge module 3 (not illustrated in FIG. 2). The memory size of the memory 6a of the bridge module 3 and of the central processing unit 8 may thus be configured to be larger or smaller depending on the requirements—within the context of the overall size of the memory used jointly. In this way, optimized utilization of the existing memory resources is possible, and no new memory components are required.

It is particularly advantageous if at least some of the memory objects 6c in the memory 6a are designed as FIFO memories (first-in, first-out memories). This is particularly advantageous if the two bus systems 1, 2 which are connected to the bridge module are driven at different data transmission rates. In this case, the FIFO memory is used as a data buffer for the data transmitted by the faster bus system 1, 2. The data can then be read out as appropriate by the slower bus system 1, 2. Conversely, a FIFO memory is, of course, also conceivable as a data buffer for reading data in.

The FIFO length indicates the total number of memory objects 6c assigned to one FIFO. The FIFO length must be chosen in a suitable manner depending on the requirement for the buffer memory and, in particular, also depends on the ratio of the data transmission rates of the fast and of the slow bus system 1, 2. The FIFO length may be redefined in an application-specific manner in a FIFO length register, and thus may also be flexible, even during a data transfer. A FIFO filling-level register makes it possible to identify which of the FIFO memory objects 6c has already been written to and which are empty.

Furthermore, the configuration of at least a part of the memory 6a as FIFO is not exclusively limited to a data transfer between a slow and a fast bus system 1, 2 but, within the context of the invention, can advantageously be applied to any data transfer between different bus systems 1, 2 using the same or different data transmission rates.

In particular, a FIFO buffer store can advantageously also be used when, for example, one of the bus systems 1, 2 is transmitting data continuously. These data can be read out in collated form from the FIFO buffer store, and can be further processed, by the second bus system 1, 2. In this way, the second bus system 1, 2 requires less computation power from the central processing unit 8 for this collated reading-out process owing to the shorter access times. It would also be conceivable for the reading out and further processing of the data via the two bus systems 1, 2 to take place at the same speed, but with intervals of different duration between the read/write cycles.

The functionality of the bridge module according to the invention is data-controlled, that is to say the specific memory split governs the functionality of the bridge module. The data are in this case not copied randomly backward and forward via the memory of the bridge module but, instead of this, the data are transferred within predetermined regions.

The exemplary embodiments described above indicate a preferred and advantageous implementation of a bridge module 3 for data transfer between different bus systems. It should be understood, however, that the list of advantageous alternatives described above is by no means complete. In fact, alternatives and combinations—possibly further advantageous alternatives and combinations—which should be obvious from the foregoing description lie within the invention.

We claim:

1. In a data transmission system having at least two bus systems, a bridge module connected between the at least two bus systems for serial data transfer of binary data from one of the bus systems to another one of the bus systems, the bridge module comprising:

a single memory device for buffer storage of data during a data transfer from one bus system to another bus system, the data transfer in the memory device being carried out under data control without a control device interposed.

2. The bridge module according to claim 1, wherein each of the at least two bus systems has a data bus and a subscriber station connected to said data bus for the purpose of data communication with one another, and wherein the bridge module is integrated in one of said subscriber stations.

3. The bridge module according to claim 2, wherein said subscriber station in which the bridge module is integrated includes an internal memory, and wherein said memory device forms a part of said internal memory.

4. The bridge module according to claim 3, wherein said memory device has a freely configurable memory size.

5. The combination according to claim 1, wherein the bridge module is connected between no more than the two bus systems.

6. The combination according to claim 1, wherein data on a first data bus of a first bus system are driven at a higher data transmission rate than on a second data bus of a second bus system and the bridge module is adapted to transmit the data between the first and second bus systems.

7. The bridge module according to claim 1, wherein at least a part of said memory device is configurable as a FIFO buffer memory.

8. A Controller Area Network (CAN) bus system, comprising at least one bridge module according to claim 1.

9. In a motor vehicle power supply system, a CAN bus system having a bridge module according to claim 1.

* * * * *